(12) United States Patent
Agapi et al.

(10) Patent No.: US 8,612,230 B2
(45) Date of Patent: Dec. 17, 2013

(54) AUTOMATIC SPEECH RECOGNITION WITH A SELECTION LIST

(75) Inventors: Ciprian Agapi, Lake Worth, FL (US); Soonthorn Ativanichayaphong, Boca Raton, FL (US); Charles W. Cross, Jr., Wellington, FL (US); Gerald M. McCobb, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 1527 days.

(21) Appl. No.: 11/619,209

(22) Filed: Jan. 3, 2007

(65) Prior Publication Data

US 2008/0162136 A1    Jul. 3, 2008

(51) Int. Cl.
  *G10L 21/00* (2013.01)
(52) U.S. Cl.
  USPC ........................................ 704/270; 704/270.1
(58) Field of Classification Search
  USPC ............................................... 704/270, 270.1
  See application file for complete search history.

(56) References Cited

U.S. PATENT DOCUMENTS

| | | | |
|---|---|---|---|
| 5,668,928 A * | 9/1997 | Groner | 704/243 |
| 5,969,717 A | 10/1999 | Ikemoto | |
| 6,243,375 B1 | 6/2001 | Speicher | |
| 6,275,806 B1 | 8/2001 | Pertrushin | |
| 6,301,560 B1 | 10/2001 | Masters | |
| 6,513,011 B1 | 1/2003 | Uwakubo | |
| 7,150,399 B2 | 12/2006 | Barrus et al. | |
| 7,330,890 B1 | 2/2008 | Partovi et al. | |
| 7,376,586 B1 | 5/2008 | Partovi et al. | |
| 7,487,085 B2 | 2/2009 | Cross | |
| 2002/0092019 A1 | 7/2002 | Marcus | |
| 2004/0019487 A1 | 1/2004 | Kleindienst et al. | |
| 2004/0044516 A1 | 3/2004 | Kennewick et al. | |
| 2004/0044523 A1* | 3/2004 | Sakai et al. | 704/201 |
| 2004/0138890 A1 | 7/2004 | Ferrans et al. | |
| 2004/0153323 A1 | 8/2004 | Charney et al. | |

(Continued)

FOREIGN PATENT DOCUMENTS

| | | |
|---|---|---|
| CN | 1385783 A | 12/2002 |
| CN | 1564123 A | 1/2005 |
| WO | WO 99/48088 | 9/1999 |

OTHER PUBLICATIONS

"Tech Tips for the Average Joe: How to Select multiple files in windows explorer" http://basictech.wordpress.com/2006/10/30/how-to-select-multiple-files-in-windows-explorer/ Oct. 30, 2006.*

(Continued)

*Primary Examiner* — Douglas Godbold
(74) *Attorney, Agent, or Firm* — Wolf, Greenfield & Sacks, P.C.

(57) ABSTRACT

Methods, apparatus, and computer program products are described for automatic speech recognition ('ASR') that include accepting by the multimodal application speech input and visual input for selecting or deselecting items in a selection list, the speech input enabled by a speech recognition grammar; providing, from the multimodal application to the grammar interpreter, the speech input and the speech recognition grammar; receiving, by the multimodal application from the grammar interpreter, interpretation results including matched words from the grammar that correspond to items in the selection list and a semantic interpretation token that specifies whether to select or deselect items in the selection list; and determining, by the multimodal application in dependence upon the value of the semantic interpretation token, whether to select or deselect items in the selection list that correspond to the matched words.

18 Claims, 7 Drawing Sheets

(56) References Cited

U.S. PATENT DOCUMENTS

| | | |
|---|---|---|
| 2004/0179038 A1 | 9/2004 | Blattner et al. |
| 2004/0236574 A1 | 11/2004 | Ativanichayaphong |
| 2005/0010418 A1* | 1/2005 | McNair et al. ............ 704/275 |
| 2005/0071172 A1* | 3/2005 | James .................... 704/275 |
| 2005/0131701 A1 | 6/2005 | Cross |
| 2005/0273769 A1 | 12/2005 | Eichenberger et al. |
| 2006/0075120 A1 | 4/2006 | Smit |
| 2006/0136221 A1* | 6/2006 | James et al. ............. 704/275 |
| 2006/0168595 A1 | 7/2006 | McArdle |
| 2006/0206336 A1* | 9/2006 | Gurram et al. ............ 704/275 |
| 2006/0271404 A1* | 11/2006 | Brown ...................... 705/2 |
| 2006/0287845 A1 | 12/2006 | Cross et al. |
| 2006/0287865 A1 | 12/2006 | Cross et al. |
| 2006/0287866 A1 | 12/2006 | Cross et al. |
| 2006/0288309 A1 | 12/2006 | Cross et al. |
| 2007/0124507 A1* | 5/2007 | Gurram et al. .............. 710/1 |
| 2007/0265851 A1 | 11/2007 | Cross et al. |
| 2007/0274296 A1 | 11/2007 | Cross et al. |
| 2007/0274297 A1 | 11/2007 | Cross et al. |
| 2007/0288241 A1 | 12/2007 | Cross et al. |
| 2007/0294084 A1 | 12/2007 | Cross |
| 2008/0065386 A1 | 3/2008 | Cross et al. |
| 2008/0065387 A1 | 3/2008 | Cross et al. |
| 2008/0065388 A1 | 3/2008 | Cross et al. |
| 2008/0065389 A1 | 3/2008 | Cross et al. |
| 2008/0065390 A1 | 3/2008 | Ativanichayaphong et al. |
| 2008/0086564 A1 | 4/2008 | Putman et al. |
| 2008/0140410 A1 | 6/2008 | Cross et al. |
| 2008/0147406 A1* | 6/2008 | Da Palma et al. .......... 704/260 |
| 2008/0162136 A1 | 7/2008 | Ativanichayaphong et al. |
| 2008/0177530 A1 | 7/2008 | Cross et al. |
| 2008/0195393 A1 | 8/2008 | Cross et al. |
| 2008/0208584 A1 | 8/2008 | Cross et al. |
| 2008/0208585 A1 | 8/2008 | Ativanichayaphong et al. |
| 2008/0208586 A1 | 8/2008 | Ativanichayaphong et al. |
| 2008/0208587 A1 | 8/2008 | Cross et al. |
| 2008/0208588 A1 | 8/2008 | Cross et al. |
| 2008/0208589 A1 | 8/2008 | Cross et al. |
| 2008/0208590 A1 | 8/2008 | Cross et al. |
| 2008/0208591 A1 | 8/2008 | Ativanichayaphong et al. |
| 2008/0208592 A1 | 8/2008 | Cross et al. |
| 2008/0208593 A1 | 8/2008 | Ativanichayaphong et al. |
| 2008/0208594 A1 | 8/2008 | Cross et al. |
| 2008/0228494 A1 | 9/2008 | Cross et al. |
| 2008/0228495 A1 | 9/2008 | Cross et al. |
| 2008/0235021 A1 | 9/2008 | Cross et al. |
| 2008/0235022 A1 | 9/2008 | Cross et al. |
| 2008/0235027 A1 | 9/2008 | Cross |
| 2008/0235029 A1 | 9/2008 | Cross et al. |
| 2008/0249782 A1 | 10/2008 | Ativanichayaphong et al. |
| 2008/0255849 A9* | 10/2008 | Gustafson .................. 704/275 |
| 2008/0255850 A1 | 10/2008 | Cross et al. |
| 2008/0255851 A1 | 10/2008 | Cross et al. |

OTHER PUBLICATIONS

U.S. Appl. No. 10/919,005, filed Dec. 2005, Eichenberger, et al.
U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.

\* cited by examiner

GUI Screen For Visual Input To A Multimodal Application

AUTOMATIC SPEECH RECOGNITION WITH A SELECTION LIST

BACKGROUND OF THE INVENTION

1. Field of the Invention

The field of the invention is data processing, or, more specifically, methods, apparatus, and products for automatic speech recognition.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications are often formed by sets of markup documents served up by web servers for display on multimodal browsers. A 'multimodal browser,' as the term is used in this specification, generally means a web browser capable of receiving multimodal input and interacting with users with multimodal output, where modes of the multimodal input and output include at least a speech mode. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

Current lightweight voice solutions require a developer to build a grammar and lexicon to limit the potential number of words that an automated speech recognition ('ASR') engine must recognize—as a means for increasing accuracy. Pervasive devices have limited interaction and input modalities due to the form factor of the device, and kiosk devices have limited interaction and input modalities by design. In both cases the use of speaker independent voice recognition is implemented to enhance the user experience and interaction with the device. The state of the art in speaker independent recognition allows for some sophisticated voice applications to be written as long as there is a limited vocabulary associated with each potential voice command. For example, if the user is prompted to speak the name of a city the system can, with a good level of confidence, recognize the name of the city spoken.

The grammar for the synchronized VoiceXML field can allow for multiple selections by means of semantic interpretation as described in the W3C working draft dated Nov. 3, 2006, and entitled "Semantic Interpretation for Speech Recognition (SISR) Version 1.0." The problem is that when the user makes a multiple selection using speech, does the user want items in the selection list to be selected from scratch, that is, first remove all previous item selections? Or does the user want to add to the selected items that are already there? This is an important consideration for large-scale applications which have many selections. How does the application anticipate what the user wants to do and how can the control of cumulative option selection using speech in multimodal applications make it easier for the user, especially if there are many item selections? There are no known solutions to this problem.

SUMMARY OF THE INVENTION

Methods, apparatus, and computer program products are described for automatic speech recognition ('ASR'), implemented with a speech recognition grammar of a multimodal application, with the multimodal application operating on a multimodal device supporting multiple modes of user interaction with the multimodal application, the modes of user interaction including a voice mode and a visual mode, the multimodal application operatively coupled to a grammar interpreter, including accepting by the multimodal application speech input and visual input for selecting or deselecting items in a selection list, the speech input enabled by a speech recognition grammar, the speech recognition grammar including a semantic interpretation script capable of producing a semantic interpretation token having a value that indicates whether to select or deselect items in the selection list; providing, from the multimodal application to the grammar interpreter, the speech input and the speech recognition grammar; receiving, by the multimodal application from the grammar interpreter, interpretation results, the interpretation results including matched words from the grammar that correspond to items in the selection list and a semantic interpretation token that specifies whether to select or deselect items in the selection list; and determining, by the multimodal application in dependence upon the value of the semantic interpretation token, whether to select or deselect items in the selection list that correspond to the matched words.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
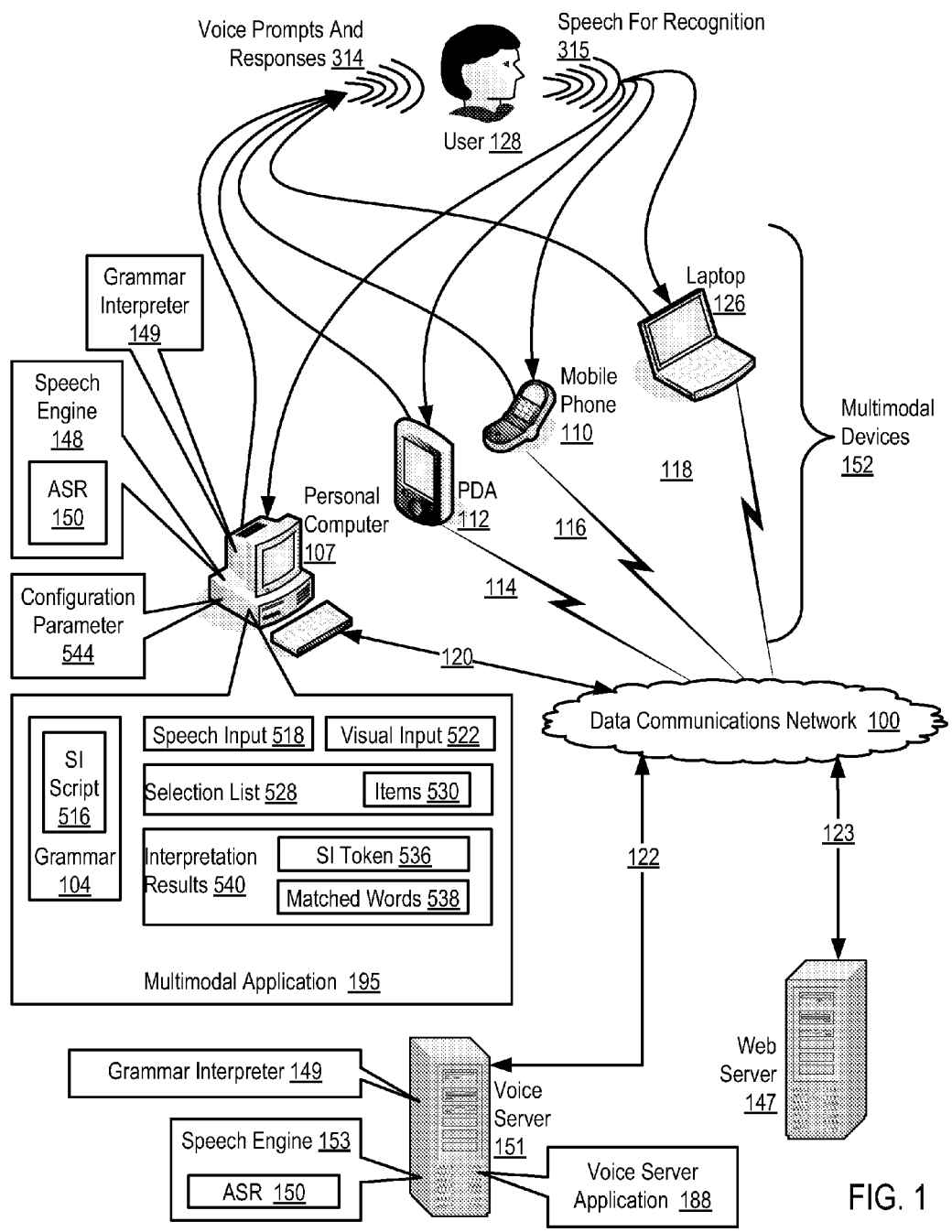
FIG. 1 sets forth a network diagram illustrating an exemplary system for automatic speech recognition according to embodiments of the present invention.

Exemplary methods, apparatus, and products for automatic speech recognition according to embodiments of the present invention are described with reference to the accompanying drawings, beginning with FIG. 1. FIG. 1 sets forth a network diagram illustrating an exemplary system for automatic speech recognition according to embodiments of the present invention. Automatic speech recognition in this example is implemented with a multimodal application (195) operating on a multimodal device (152). The system of FIG. 1 includes at least one speech recognition grammar (104) that specifies words and phrases to be recognized by an automatic speech recognition ('ASR') engine (150) of a speech engine (148, 153). The multimodal device (152) supports multiple modes of user interaction with the multimodal application including a voice mode and one or more non-voice modes of user interaction with the multimodal application. The voice mode is represented here with audio output of voice prompts and responses (177) from the multimodal devices and audio input of speech for recognition (315) from a user (128). Non-voice modes are represented by input/output devices such as keyboards and display screens on the multimodal devices (152). The non-voice modes include at least one visual mode in which a user may interact with the multimodal application through mouse or keyboard interaction with a graphical user interface ('GUI'), for example. The multimodal application is operatively coupled (195) to a grammar interpreter (149). The grammar interpreter (149) uses an ASR engine (150) in a speech engine (148) for speech recognition. The operative coupling may be implemented with an application programming interface ('API'), a voice service module, or a VOIP connection as explained in more detail below.

In the example system of FIG. 1, a multimodal application (195) operates generally to carry out automatic speech recognition according to embodiments of the present invention by matching by accepting speech input (518) and visual input (522) for selecting or deselecting items (530) in a selection list (528). The speech input is enabled by a speech recognition grammar (104). The speech recognition grammar (104) includes a semantic interpretation script (516) capable of producing a semantic interpretation token (536) having a value that indicates whether to select or deselect items (530) in the selection list (528). The multimodal application (195) provides the speech input (518) and the speech recognition grammar (104) to a grammar interpreter (149) for interpretation of the speech input. The multimodal application receives back from the grammar interpreter (149) interpretation results (540). The interpretation results (540) include matched words (538) from the grammar (104) that correspond to items (530) in the selection list (528) and a semantic interpretation token (536) that specifies whether to select or deselect items (530) in the selection list (528). The multimodal application (195) determines whether to select or deselect items (530) in the selection list (528) that correspond to the matched words (538) in dependence upon the value of the semantic interpretation token (536).

The semantic interpretation script (516) may also be capable of producing a semantic interpretation token (536) specifying that all items (530) in the selection list (528) are to be either selected or deselected. Then the received interpretation results (540) may include a semantic interpretation token (536) that specifies whether to select or deselect all items (530) in the selection list (528), and the multimodal application may determine, in dependence upon the value of the semantic interpretation token, whether to select or deselect all items in the selection list, regardless of correspondence of items in the selection list to the matched words. In such an example, if the matched words (538) correspond to three out of six items (530) in the selection list (528) and the value of the semantic interpretation token (536) specifies that all of the items (530) in the selection list (528) are to be selected, then the multimodal application (195) selects all the items in the selection list regardless of the fact that only three of the items in the selection list correspond to matched words from the grammar.

A multimodal device (152) may support a configuration parameter (544) for the multimodal application, where the value of the configuration parameter is user-editable. The value of the configuration parameter (544) indicates whether to add to existing item selections items that correspond to the matched words or replace existing item selections with items that correspond to the matched words. The multimodal application (195) may determine whether to select or deselect items (530) in the selection list (528) that correspond to the matched words in dependence upon the value of the configuration parameter (544), regardless of the value of the semantic interpretation token (536). In such an example, if the value of the semantic interpretation token (536) indicates that items (530) in the selection list (528) corresponding to matched words (538) from the grammar are to be selected, and the value of the configuration parameter (544) indicates that items (530) in the selection list (528) corresponding to matched words (538) from the grammar are to be deselected, then the multimodal application (195) would deselect items (530) in the selection list (528) corresponding to matched words (538) from the grammar.

The multimodal application (195) may synchronize the speech input (518) with the visual input (522). In multimodal application implemented with X+V, for example, speech input and visual input may be synchronized by use of a <sync> element, so that speech dialog results are returned to both the active VoiceXML input field and the corresponding XHTML <input> element, and keyboard data entered into the <input> element updates both the VoiceXML field and the XHTML <input> element.

A multimodal device is an automated device, that is, automated computing machinery or a computer program running on an automated device, that is capable of accepting from users more than one mode of input, keyboard, mouse, stylus, and so on, including speech input—and also displaying more than one mode of output, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, this specification uses the term 'multimodal application' to refer to any software application, server-oriented or client-oriented, thin client or thick client, that administers more than one mode of input and more than one mode of output, typically including visual and speech modes.

The system of FIG. 1 includes several example multimodal devices:
- personal computer (107) which is coupled for data communications to data communications network (100) through wireline connection (120),
- personal digital assistant ('PDA') (112) which is coupled for data communications to data communications network (100) through wireless connection (114),
- mobile telephone (110) which is coupled for data communications to data communications network (100) through wireless connection (116), and
- laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled RTP Payload Format for European Telecommunications Standards Institute (ETSI) European Standard ES 201 108 Distributed Speech Recognition Encoding and the Internet Draft entitled RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Speech for automatic speech recognition according to embodiments of the present invention may be encoded with any codec, including, for example:
- AMR (Adaptive Multi-Rate Speech coder)
- ARDOR (Adaptive Rate-Distortion Optimized sound codeR),
- Dolby Digital (A/52, AC3),
- DTS (DTS Coherent Acoustics),
- MP1 (MPEG audio layer-1),
- MP2 (MPEG audio layer-2) Layer 2 audio codec (MPEG-1, MPEG-2 and non-ISO MPEG-2.5),
- MP3 (MPEG audio layer-3) Layer 3 audio codec (MPEG-1, MPEG-2 and non-ISO MPEG-2.5),
- Perceptual Audio Coding,
- FS-1015 (LPC-10),
- FS-1016 (CELP),
- G.726 (ADPCM),
- G.728 (LD-CELP),
- G.729 (CS-ACELP),
- GSM,
- HILN (MPEG-4 Parametric audio coding), and
- others as may occur to those of skill in the art.

As mentioned, a multimodal device according to embodiments of the present invention is capable of providing speech to a speech engine for recognition. A speech engine is a functional module, typically a software module, although it may include specialized hardware also, that does the work of recognizing and generating or 'synthesizing' human speech. The speech engine implements speech recognition by use of a further module referred to in this specification as a ASR engine, and the speech engine carries out speech synthesis by use of a further module referred to in this specification as a text-to-speech ('TTS') engine. As shown in FIG. 1, a speech engine (148) may be installed locally in the multimodal device (107) itself, or a speech engine (153) may be installed remotely with respect to the multimodal device, across a data communications network (100) in a voice server (151). A multimodal device that itself contains its own speech engine is said to implement a 'thick multimodal client' or 'thick client,' because the thick multimodal client device itself contains all the functionality needed to carry out speech recognition and speech synthesis—through API calls to speech recognition and speech synthesis modules in the multimodal device itself with no need to send requests for speech recognition across a network and no need to receive synthesized speech across a network from a remote voice server. A multimodal device that does not contain its own speech engine is said to implement a 'thin multimodal client' or simply a 'thin client,' because the thin multimodal client itself contains only a relatively thin layer of multimodal application software that obtains speech recognition and speech synthesis services from a voice server located remotely across a network from the thin client. For ease of explanation, only one (107) of the multimodal devices (152) in the system of FIG. 1 is shown with a speech engine (148), but readers will recognize that any multimodal device may have a speech engine according to embodiments of the present invention.

A multimodal application (195) in this example provides speech for recognition and text for speech synthesis to a speech engine through a VoiceXML interpreter (149, 155). A VoiceXML interpreter is a software module of computer program instructions that accepts voice dialog instructions from a multimodal application, typically in the form of a VoiceXML <form> element. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA').

As shown in FIG. 1, a VoiceXML interpreter (149) may be installed locally in the multimodal device (107) itself, or a VoiceXML interpreter (155) may be installed remotely with respect to the multimodal device, across a data communications network (100) in a voice server (151). In a thick client architecture, a multimodal device (152) includes both its own speech engine (148) and its own VoiceXML interpreter (149). The VoiceXML interpreter (149) exposes an API to the multimodal application (195) for use in providing speech recognition and speech synthesis for the multimodal application. The multimodal application provides dialog instructions, VoiceXML <form> elements, grammars, input elements, event handlers, and so on, through the API to the VoiceXML interpreter, and the VoiceXML interpreter administers the speech engine on behalf of the multimodal application. In the thick client architecture, VoiceXML dialogs are interpreted by a VoiceXML interpreter on the multimodal device. In the thin client architecture, VoiceXML dialogs are interpreted by a VoiceXML interpreter on a voice server (151) located remotely across a data communications network (100) from the multimodal device running the multimodal application (195).

The VoiceXML interpreter provides grammars, speech for recognition, and text prompts for speech synthesis to the speech engine, and the VoiceXML interpreter returns to the multimodal application speech engine output in the form of recognized speech, semantic interpretation results, and digitized speech for voice prompts. In a thin client architecture, the VoiceXML interpreter (155) is located remotely from the multimodal client device in a voice server (151), the API for the VoiceXML interpreter is still implemented in the multimodal device, with the API modified to communicate voice dialog instructions, speech for recognition, and text and voice prompts to and from the VoiceXML interpreter on the voice server. For ease of explanation, only one (107) of the multimodal devices (152) in the system of FIG. 1 is shown with a VoiceXML interpreter (149), but readers will recognize that any multimodal device may have a VoiceXML interpreter according to embodiments of the present invention. Each of the example multimodal devices (152) in the system of FIG. 1 may be configured to carry out automatic speech recognition by installing and running on the multimodal device a multimodal application that carries out automatic speech recognition with a selection list according to embodiments of the present invention.

The use of these four example multimodal devices (152) is for explanation only, not for limitation of the invention. Any automated computing machinery capable of accepting speech from a user, providing the speech digitized to an ASR engine through a VoiceXML interpreter, and receiving and playing speech prompts and responses from the VoiceXML interpreter may be improved to function as a multimodal device for automatic speech recognition according to embodiments of the present invention.

The system of FIG. 1 also includes a voice server (151) which is connected to data communications network (100) through wireline connection (122). The voice server (151) is a computer that runs a speech engine (153) that provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal applications such as, for example, X+V applications, SALT applications, or Java voice applications.

The system of FIG. 1 includes a data communications network (100) that connects the multimodal devices (152) and the voice server (151) for data communications. A data communications network for automatic speech recognition according to embodiments of the present invention is a data communications data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

- a link layer with the Ethernet™ Protocol or the Wireless Ethernet™ Protocol,
- a data communications network layer with the Internet Protocol ('IP'),
- a transport layer with the Transmission Control Protocol ('TCP') or the User Datagram Protocol ('UDP'),
- an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
- other protocols as will occur to those of skill in the art.

The system of FIG. 1 includes a web server (147) connected for data communications through wireline connection (123) to network (100) and therefore to the multimodal devices (152). The web server (147) may be any server that provides to client devices markup documents that compose multimodal applications. The web server (147) typically provides such markup documents via a data communications protocol, HTTP, HDTP, WAP, or the like. That is, although the term 'web' is used to described the web server generally in this specification, there is no limitation of data communications between multimodal devices and the web server to HTTP alone. The markup documents also may be implemented in any markup language that supports non-speech display elements, data entry elements, and speech elements for identifying which speech to recognize and which words to speak, grammars, form elements, and the like, including, for example, X+V and SALT. A multimodal application in a multimodal device then, upon receiving from the web sever (147) a markup document as part of a multimodal application, may execute speech elements by use of a VoiceXML interpreter (149) and speech engine (148) in the multimodal device itself or by use of a VoiceXML interpreter (155) and speech engine (153) located remotely from the multimodal device in a voice server (151).

The arrangement of the multimodal devices (152), the web server (147), the voice server (151), and the data communications network (100) making up the exemplary system illustrated in FIG. 1 are for explanation, not for limitation. Data processing systems useful for automatic speech recognition according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Automatic speech recognition according to embodiments of the present invention in a thin client architecture may be implemented with one or more voice servers, computers, that is, automated computing machinery, that provide speech recognition and speech synthesis. For further explanation, therefore, FIG. 2 sets forth a block diagram of automated computing machinery comprising an example of a computer useful as a voice server (151) in automatic speech recognition according to embodiments of the present invention. The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server.

Stored in RAM (168) is a voice server application (188), a module of computer program instructions capable of operating a voice server in a system that is configured to carry out automatic speech recognition according to embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in multimodal applications such as, for example, X+V applications, SALT applications, or Java Speech applications.

Voice server application (188) may be implemented as a web server, implemented in Java, C++, or another language, that supports X+V, SALT, VoiceXML, or other multimodal languages, by providing responses to HTTP requests from X+V clients, SALT clients, Java Speech clients, or other multimodal clients. Voice server application (188) may, for a further example, be implemented as a Java server that runs on a Java Virtual Machine (102) and supports a Java voice framework by providing responses to HTTP requests from Java client applications running on multimodal devices. And voice server applications that support automatic speech recognition may be implemented in other ways as may occur to those of skill in the art, and all such ways are well within the scope of the present invention.

The voice server (151) in this example includes a speech engine (153). The speech engine is a functional module, typically a software module, although it may include specialized hardware also, that does the work of recognizing and generating human speech. The speech engine (153) includes an automated speech recognition ('ASR') engine for speech recognition and a text-to-speech ('TTS') engine for generating speech. The speech engine also includes a grammar (104), a lexicon (106), and a language-specific acoustic model (108). The language-specific acoustic model (108) is a data structure, a table or database, for example, that associates SFVs with phonemes representing, to the extent that it is practically feasible to do so, all pronunciations of all the words in a human language. The lexicon (106) is an association of words in text form with phonemes representing pronunciations of each word; the lexicon effectively identifies words that are capable of recognition by an ASR engine. Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

The grammar (104) communicates to the ASR engine (150) the words and sequences of words that currently may be recognized. For precise understanding, distinguish the purpose of the grammar and the purpose of the lexicon. The lexicon associates with phonemes all the words that the ASR engine can recognize. The grammar communicates the words currently eligible for recognition. The set of words currently eligible for recognition and the set of words capable of recognition may or may not be the same.

Grammars for use in automatic speech recognition according to embodiments of the present invention may be expressed in any format supported by any ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
    #JSGF V1.0;
    grammar command;
    <command> =
    [remind me to] call | phone | telephone <name> <when>;
    <name> = bob | martha | joe | pete | chris | john | artoush;
    <when> = today | this afternoon | tomorrow | next week;
    ]]>
</grammar>
```

In this example, the elements named <command>, <name>, and <when> are rules of the grammar. Rules are a combination of a rulename and an expansion of a rule that advises an ASR engine or a grammar interpreter which words presently can be recognized. In this example, expansion includes conjunction and disjunction, and the vertical bars '|' mean 'or.' An ASR engine or a grammar interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush', and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

The voice server application (188) in this example is configured to receive, from a multimodal client located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech.

The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars. VoiceXML input to VoiceXML interpreter (192) may originate, for example, from VoiceXML clients running remotely on multimodal devices, from X+V clients running remotely on multimodal devices, from SALT clients running on multimodal devices, or from Java client applications running remotely on multimedia devices. In this example, VoiceXML interpreter (192) interprets and executes VoiceXML segments representing voice dialog instructions received from remote multimedia devices and provided to VoiceXML interpreter (192) through voice server application (188).

A multimodal application (195) in a thin client architecture may provide voice dialog instructions, VoiceXML segments, VoiceXML <form> elements, and the like, to VoiceXML interpreter (149) through data communications across a network with multimodal application (195). The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA'). The VoiceXML interpreter interprets VoiceXML dialogs provided to the VoiceXML interpreter by a multimodal application.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), voice server application (188), VoiceXML interpreter (192), ASR engine (150), JVM (102), and TTS Engine (194) in the example of FIG. 2 are shown in RAM (168), but many components of such software typically are stored in non-volatile memory also, for example, on a disk drive (170).

Figure 2:
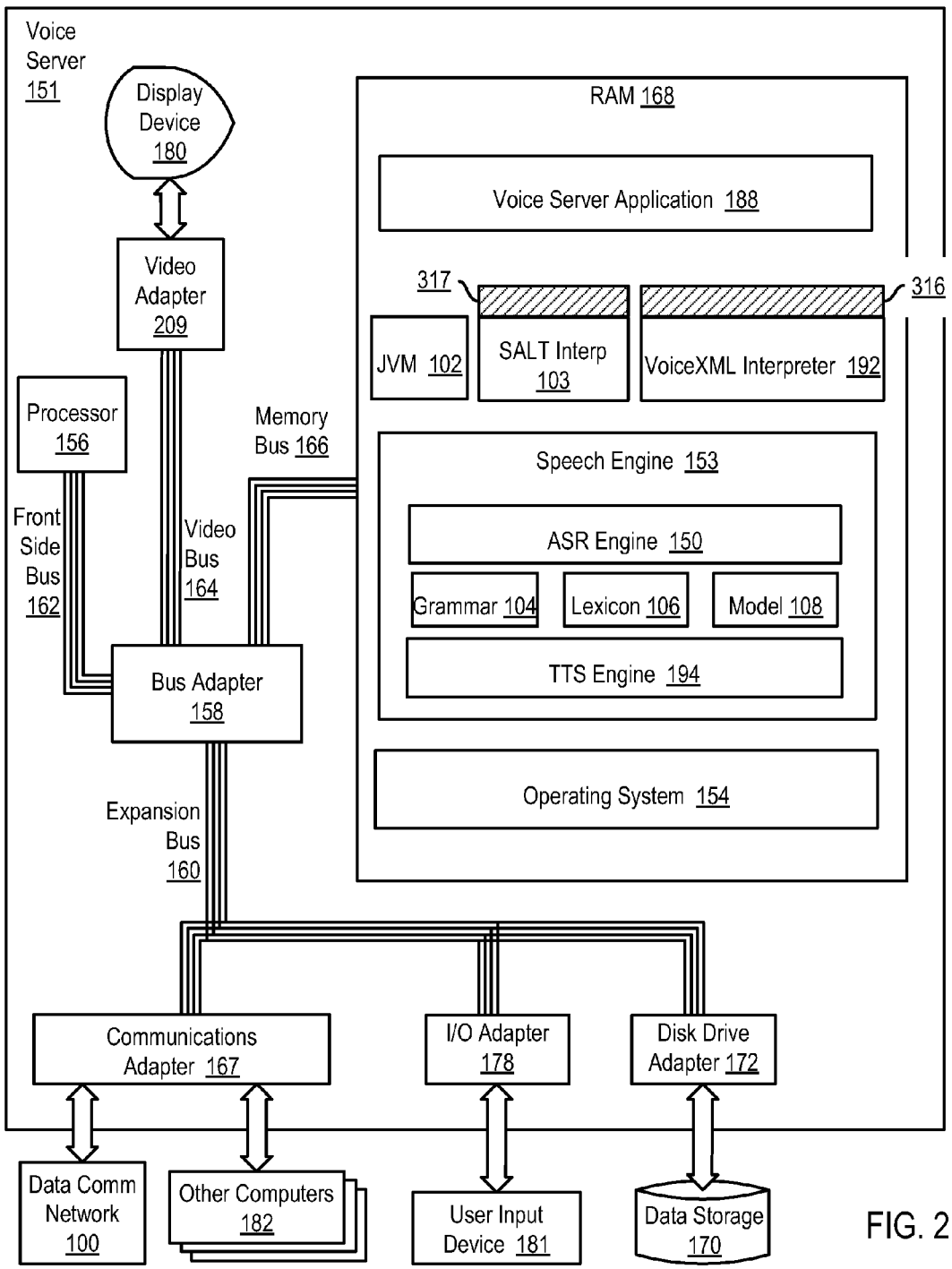
FIG. 2 sets forth a block diagram of automated computing machinery comprising an example of a computer useful as a voice server in automatic speech recognition according to embodiments of the present invention.

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for automatic speech recognition according to embodiments of the present invention include modems for wired dial-up communications, Ethernet (IEEE 802.3) adapters for wired data communications network communications, and 802.11 adapters for wireless data communications network communications.

Figure 3:
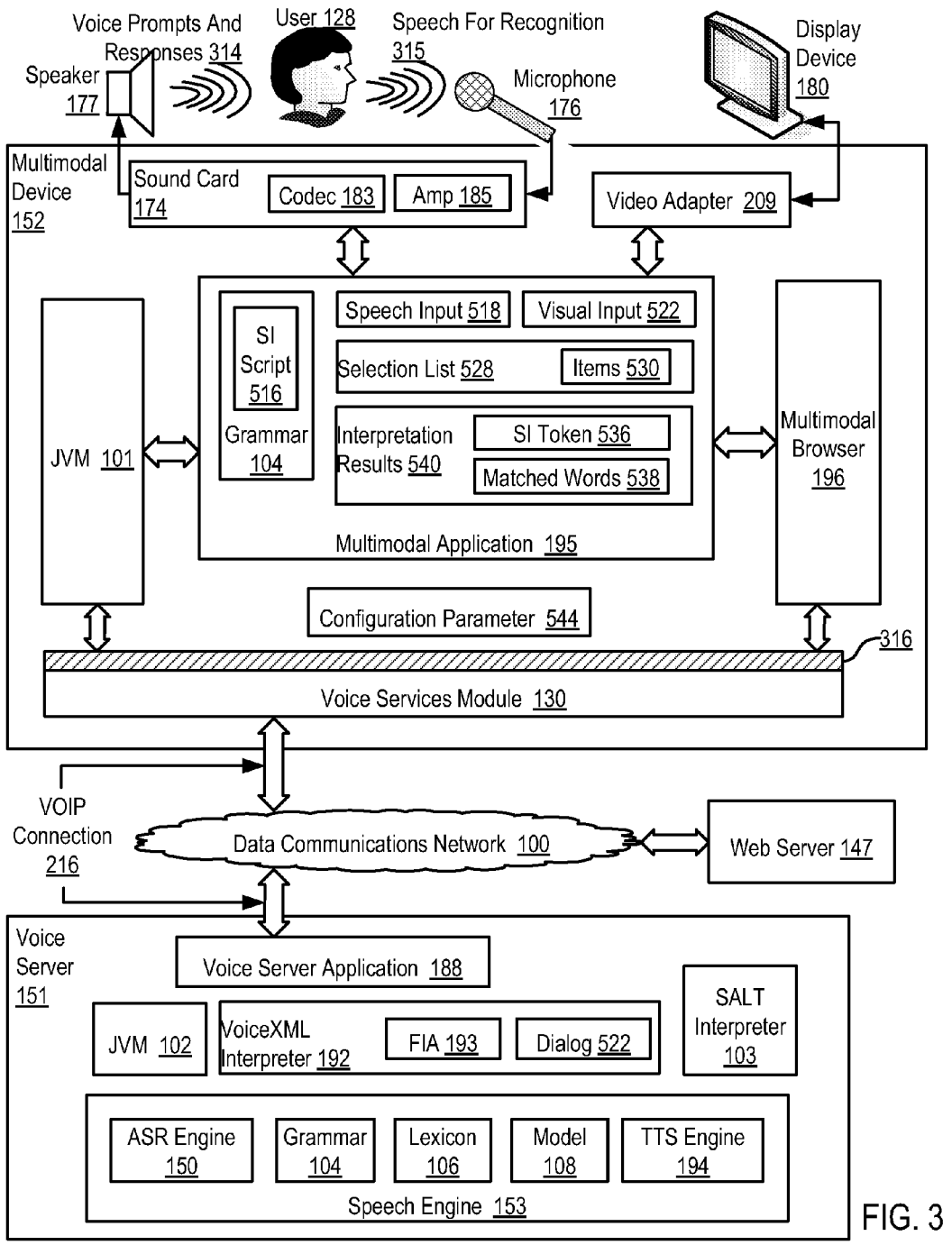
FIG. 3 sets forth a functional block diagram of exemplary apparatus for automatic speech recognition according to embodiments of the present invention.

For further explanation, FIG. 3 sets forth a functional block diagram of exemplary apparatus for automatic speech recognition in a thin client architecture according to embodiments of the present invention. The example of FIG. 3 includes a multimodal device (152) and a voice server (151) connected for data communication by a VOIP connection (216) through a data communications network (100). A multimodal application (195) runs on the multimodal device (152), and a voice server application (188) runs on the voice server (151). The multimodal client application (195) may be a set or sequence of X+V or SALT documents that execute on multimodal browser (196), a Java voice application that executes on the Java Virtual Machine (101), or a multimodal application implemented in other technologies as may occur to those of skill in the art. The example multimodal device of FIG. 3 also includes a sound card (174), which is an example of an I/O adapter specially designed for accepting analog audio signals from a microphone (176) and converting the audio analog signals to digital form for further processing by a codec (183).

In addition to the multimodal sever application (188), the voice server (151) also has installed upon it a speech engine (153) with an ASR engine (150), a grammar (104), a lexicon (106), a language-specific acoustic model (108), and a TTS engine (194), as well as a JVM (102), and a Voice XML interpreter (192). VoiceXML interpreter (192) interprets and executes VoiceXML dialog instructions received from the multimodal application and provided to VoiceXML interpreter (192) through voice server application (188). VoiceXML input to VoiceXML interpreter (192) may originate from the multimodal application (195) implemented as an X+V client running remotely on the multimodal device (152). As noted above, the multimedia device application (195) also may be implemented as a Java client application running remotely on the multimedia device (152), a SALT application running remotely on the multimedia device (152), and in other ways as may occur to those of skill in the art.

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers.

SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 3 operates in a manner that is similar to the operation of the system of FIG. 2 described above. Multimodal application (195) is a user-level, multimodal, client-side computer program that presents a voice interface to user (128), provides audio prompts and responses (314) and accepts input speech for recognition (315). Multimodal application (195) provides a speech interface through which a user may provide oral speech for recognition through microphone (176) and have the speech digitized through an audio amplifier (185) and a coder/decoder ('codec') (183) of a sound card (174) and provide the digitized speech for recognition to ASR engine (150). Multimodal application (195) then packages the digitized speech in a recognition request message according to a VOIP protocol, and transmits the speech to voice server (151) through the VOIP connection (216) on the network (100).

Voice server application (188) provides voice recognition services for multimodal devices by accepting dialog instructions, VoiceXML segments, and returning speech recognition results, including text representing recognized speech, text for use as variable values in dialogs, and output from execution of semantic interpretation scripts as well as voice prompts. Voice server application (188) includes computer program instructions that provide text-to-speech ('TTS') conversion for voice prompts and voice responses to user input in multimodal applications such as, for example, X+V applications, SALT applications, or Java Speech applications.

The voice server application (188) receives speech for recognition from a user and passes the speech through API calls to VoiceXML interpreter (192) which in turn uses an ASR engine (150) for speech recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106). The ASR engine then compares speech found as words in the lexicon to words in a grammar (104) to determine whether words or phrases in speech are recognized by the ASR engine.

In the example system of FIG. 3, a multimodal application (195) operates generally to carry out automatic speech recognition according to embodiments of the present invention by matching by accepting speech input (518) and visual input (522) for selecting or deselecting items (530) in a selection list (528). The speech input is enabled by a speech recognition grammar (104). The speech recognition grammar (104) includes a semantic interpretation script (516) capable of producing a semantic interpretation token (536) having a value that indicates whether to select or deselect items (530) in the selection list (528). The multimodal application (195) provides the speech input (518) and the speech recognition grammar (104) to a grammar interpreter (149) for interpretation of the speech input. The multimodal application receives back from the grammar interpreter (149) interpretation results (540). The interpretation results (540) include matched words (538) from the grammar (104) that correspond to items (530) in the selection list (528) and a semantic interpretation token (536) that specifies whether to select or deselect items (530) in the selection list (528). The multimodal application (195) determines whether to select or deselect items (530) in the selection list (528) that correspond to the matched words (538) in dependence upon the value of the semantic interpretation token (536).

The semantic interpretation script (516) may also be capable of producing a semantic interpretation token (536) specifying that all items (530) in the selection list (528) are to be either selected or deselected. Then the received interpretation results (540) may include a semantic interpretation token (536) that specifies whether to select or deselect all items (530) in the selection list (528), and the multimodal application may determine, in dependence upon the value of the semantic interpretation token, whether to select or deselect all items in the selection list, regardless of correspondence of items in the selection list to the matched words. In such an example, if the matched words (538) correspond to three out of six items (530) in the selection list (528) and the value of the semantic interpretation token (536) specifies that all of the items (530) in the selection list (528) are to be selected, then the multimodal application (195) selects all the items in the selection list regardless of the fact that only three of the items in the selection list correspond to matched words from the grammar.

A multimodal device (152) may support a configuration parameter (544) for the multimodal application, where the value of the configuration parameter is user-editable. The value of the configuration parameter (544) indicates whether to add to existing item selections items that correspond to the matched words or replace existing item selections with items that correspond to the matched words. The multimodal application (195) may determine whether to select or deselect items (530) in the selection list (528) that correspond to the matched words in dependence upon the value of the configuration parameter (544), regardless of the value of the semantic interpretation token (536). In such an example, if the value of the semantic interpretation token (536) indicates that items (530) in the selection list (528) corresponding to matched words (538) from the grammar are to be selected, and the value of the configuration parameter (544) indicates that items (530) in the selection list (528) corresponding to matched words (538) from the grammar are to be deselected, then the multimodal application (195) would deselect items (530) in the selection list (528) corresponding to matched words (538) from the grammar.

The multimodal application (195) may synchronize the speech input (518) with the visual input (522). In multimodal application implemented with X+V, for example, speech input and visual input may be synchronized by use of a <sync> element, so that speech dialog results are returned to both the active VoiceXML input field and the corresponding XHTML <input> element, and keyboard data entered into the <input> element updates both the VoiceXML field and the XHTML <input> element.

The multimodal application (195) is operatively coupled to the ASR engine (150). In this example, the operative coupling between the multimodal application and the ASR engine (150) is implemented with a VOIP connection (216) through a voice services module (130), then through the voice server application (188) and either JVM (102), VoiceXML interpreter (192), or SALT interpreter (103), depending on whether the multimodal application is implemented in X+V, Java, or SALT. The voice services module (130) is a thin layer of functionality, a module of computer program instructions, that presents an API (316) for use by an application level program in providing dialog instructions and speech for recognition to a voice server application (188) and receiving in response voice prompts and other responses. In this example, application level programs are represented by multimodal application (195), JVM (101), and multimodal browser (196).

The voice services module (130) provides data communications services through the VOIP connection and the voice server application (188) between the multimodal device (152) and the VoiceXML interpreter (192). The API (316) is the same API presented to applications by a VoiceXML interpreter when the VoiceXML interpreter is installed on the multimodal device in a thick client architecture (316 on FIG. 4). So from the point of view of an application calling the API (316), the application is calling the VoiceXML interpreter directly. The data communications functions of the voice services module (130) are transparent to applications that call the API (316). At the application level, calls to the API (316) may be issued from the multimodal browser (196), which provides an execution environment for the multimodal application (195) when the multimodal application is implemented with X+V. And calls to the API (316) may be issued from the JVM (101), which provides an execution environment for the multimodal application (195) when the multimodal application is implemented with Java.

Figure 4:
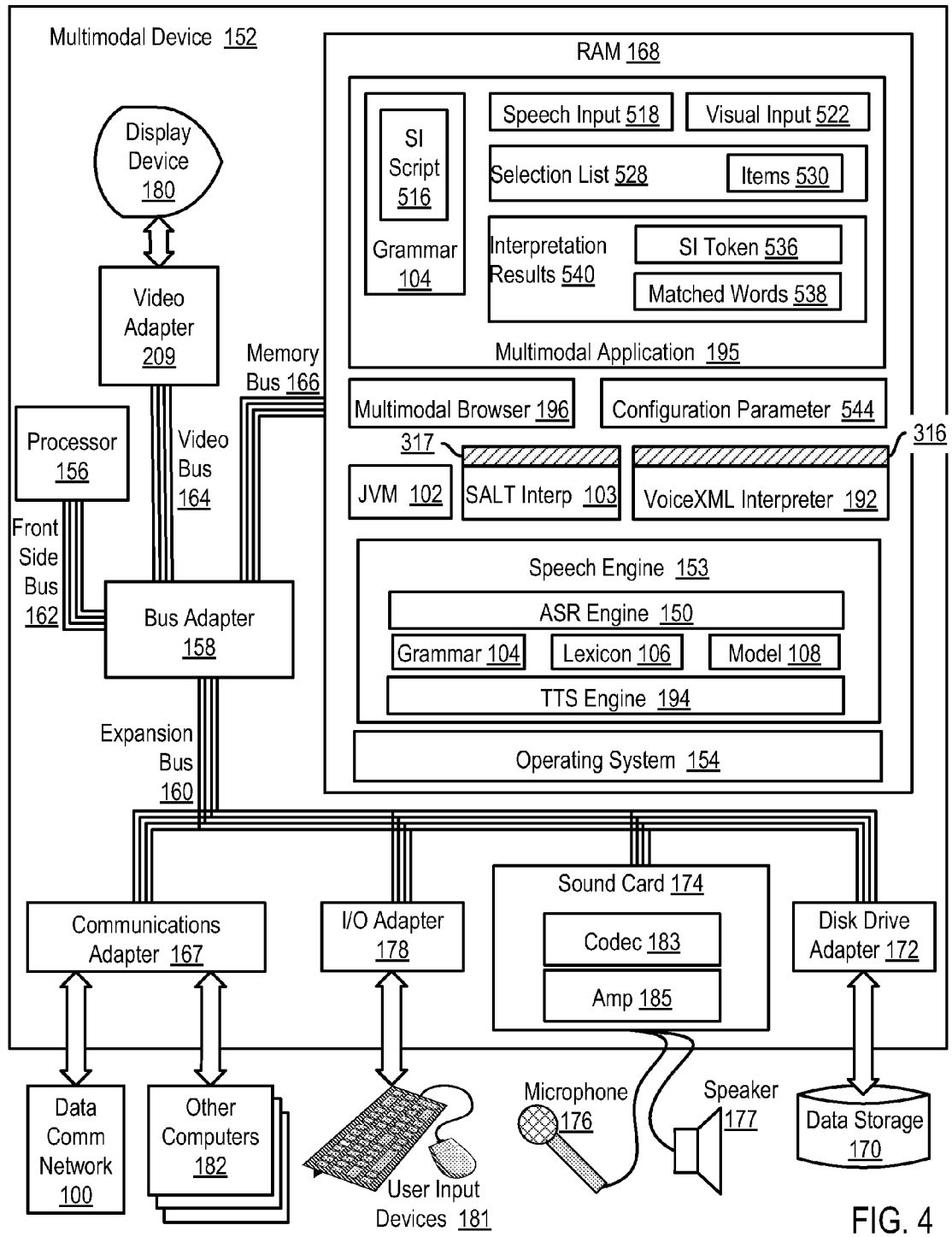
FIG. 4 sets forth a block diagram of automated computing machinery comprising an example of a computer useful as a multimodal device in automatic speech recognition according to embodiments of the present invention.

Automatic speech recognition according to embodiments of the present invention in thick client architectures is generally implemented with multimodal devices, that is, automated computing machinery or computers. In the system of FIG. 1, for example, all the multimodal devices (152) are implemented to some extent at least as computers. For further explanation, therefore, FIG. 4 sets forth a block diagram of automated computing machinery comprising an example of a computer useful as a multimodal device (152) in automatic speech recognition according to embodiments of the present invention. In a multimodal device implementing a thick client architecture as illustrated in FIG. 4, the multimodal device (152) has no connection to a remote voice server containing a VoiceXML interpreter and a speech engine. All the components needed for speech synthesis and voice recognition in automatic speech recognition according to embodiments of the present invention are installed or embedded in the multimodal device itself.

The example multimodal device (152) of FIG. 4 includes several components that are structured and operate similarly as do parallel components of the voice server, having the same drawing reference numbers, as described above with reference to FIG. 2: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), a JVM (102), a VoiceXML Interpreter (192), a speech engine (153), and so on. As in the system of FIG. 4, the speech engine in the multimodal device of FIG. 2 includes an ASR engine (150), a grammar (104), a lexicon (106), a language-dependent acoustic model (108), and a TTS engine (194). The VoiceXML interpreter (192) administers such dialogs by processing the dialog instructions sequentially in accordance with a VoiceXML Form Interpretation Algorithm ('FIA') (193).

The speech engine (153) in this kind of embodiment, a thick client architecture, often is implemented as an embedded module in a small form factor device such as a handheld device, a mobile phone, PDA, and the like. An example of an embedded speech engine useful for automatic speech recognition according to embodiments of the present invention is IBM's Embedded ViaVoice Enterprise. The example multimodal device of FIG. 4 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Also stored in RAM (168) in this example is a multimodal application (195), a module of computer program instructions capable of operating a multimodal device as an apparatus that supports automatic speech recognition according to embodiments of the present invention. The multimodal application (195) implements speech recognition by accepting speech for recognition from a user and sending the speech for recognition through API calls to the ASR engine (150). The multimodal application (195) implements speech synthesis generally by sending words to be used as prompts for a user to the TTS engine (194). As an example of thick client architecture, the multimodal application (195) in this example does not send speech for recognition across a network to a voice server for recognition, and the multimodal application (195) in this example does not receive synthesized speech, TTS prompts and responses, across a network from a voice server. All grammar processing, voice recognition, and text to speech conversion in this example is performed in an embedded fashion in the multimodal device (152) itself.

More particularly, multimodal application (195) in this example is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal application (195) may be implemented as a set or sequence of X+V documents executing in a multimodal browser (196) or microbrowser that passes VoiceXML grammars and digitized speech by calls through an API (316) directly to an embedded VoiceXML interpreter (192) for processing. The embedded VoiceXML interpreter (192) may in turn issue requests for speech recognition through API calls directly to the embedded ASR engine (150). Multimodal application (195) also can provide speech synthesis, TTS conversion, by API calls to the embedded TTS engine (194) for voice prompts and voice responses to user input.

In a further class of exemplary embodiments, the multimodal application (195) may be implemented as a Java voice application that executes on Java Virtual Machine (102) and issues calls through the VoiceXML API (316) for speech recognition and speech synthesis services. In further exemplary embodiments, the multimodal application (195) may be implemented as a set or sequence of SALT documents executed on a multimodal browser (196) or microbrowser that issues calls through the VoiceXML API (316) for speech recognition and speech synthesis services. In addition to X+V, SALT, and Java implementations, multimodal application (195) may be implemented in other technologies as will occur to those of skill in the art, and all such implementations are well within the scope of the present invention.

In the example system of FIG. 4, a multimodal application (195) operates generally to carry out automatic speech recognition according to embodiments of the present invention by matching by accepting speech input (518) and visual input (522) for selecting or deselecting items (530) in a selection list (528). The speech input is enabled by a speech recognition grammar (104). The speech recognition grammar (104) includes a semantic interpretation script (516) capable of producing a semantic interpretation token (536) having a value that indicates whether to select or deselect items (530) in the selection list (528). The multimodal application (195) provides the speech input (518) and the speech recognition grammar (104) to a grammar interpreter (149) for interpretation of the speech input. The multimodal application receives back from the grammar interpreter (149) interpretation results (540). The interpretation results (540) include matched words (538) from the grammar (104) that correspond to items (530) in the selection list (528) and a semantic interpretation token (536) that specifies whether to select or deselect items (530) in the selection list (528). The multimodal application (195) determines whether to select or deselect items (530) in the selection list (528) that correspond to the matched words (538) in dependence upon the value of the semantic interpretation token (536).

The semantic interpretation script (516) may also be capable of producing a semantic interpretation token (536) specifying that all items (530) in the selection list (528) are to be either selected or deselected. Then the received interpretation results (540) may include a semantic interpretation token (536) that specifies whether to select or deselect all items (530) in the selection list (528), and the multimodal application may determine, in dependence upon the value of the semantic interpretation token, whether to select or deselect all items in the selection list, regardless of correspondence of items in the selection list to the matched words. In such an example, if the matched words (538) correspond to three out of six items (530) in the selection list (528) and the value of the semantic interpretation token (536) specifies that all of the items (530) in the selection list (528) are to be selected, then the multimodal application (195) selects all the items in the selection list regardless of the fact that only three of the items in the selection list correspond to matched words from the grammar.

A multimodal device (152) may support a configuration parameter (544) for the multimodal application, where the value of the configuration parameter is user-editable. The value of the configuration parameter (544) indicates whether to add to existing item selections items that correspond to the matched words or replace existing item selections with items that correspond to the matched words. The multimodal application (195) may determine whether to select or deselect items (530) in the selection list (528) that correspond to the matched words in dependence upon the value of the configuration parameter (544), regardless of the value of the semantic interpretation token (536). In such an example, if the value of the semantic interpretation token (536) indicates that items (530) in the selection list (528) corresponding to matched words (538) from the grammar are to be selected, and the value of the configuration parameter (544) indicates that items (530) in the selection list (528) corresponding to matched words (538) from the grammar are to be deselected, then the multimodal application (195) would deselect items (530) in the selection list (528) corresponding to matched words (538) from the grammar.

The multimodal application (195) may synchronize the speech input (518) with the visual input (522). In multimodal application implemented with X+V, for example, speech input and visual input may be synchronized by use of a <sync> element, so that speech dialog results are returned to both the active VoiceXML input field and the corresponding XHTML <input> element, and keyboard data entered into the <input> element updates both the VoiceXML field and the XHTML <input> element.

The multimodal application (195) is operatively coupled to the ASR engine (150). In this example, the operative coupling between the multimodal application and the ASR engine (150) is implemented either JVM (102), VoiceXML interpreter (192), or SALT interpreter (103), depending on whether the multimodal application is implemented in X+V, Java, or SALT. When the multimodal application (195) is implemented in X+V, the operative coupling is effected through the multimodal browser (196), which provides an operating environment and an interpreter for the X+V application, and then through the VoiceXML interpreter, which passes grammars and voice utterances for recognition to the ASR engine. When the multimodal application (195) is implemented in Java Speech, the operative coupling is effected through the JVM (102), which provides an operating environment for the Java application and passes grammars and voice utterances for recognition to the ASR engine. When the multimodal application (195) is implemented in SALT, the operative coupling is effected through the SALT interpreter (103), which provides an operating environment and an interpreter for the X+V application and passes grammars and voice utterances for recognition to the ASR engine.

The multimodal application (195) in this example, running on a multimodal device (152) that contains its own VoiceXML interpreter (192) and its own speech engine (153) with no network or VOIP connection to a remote voice server containing a remote VoiceXML interpreter or a remote speech engine, is an example of a so-called 'thick client architecture,' so-called because all of the functionality for processing voice mode interactions between a user and the multimodal application—as well as the functionality for automatic speech recognition with a selection list according to embodiments of the present invention—is implemented on the multimodal device itself.

Figure 5:
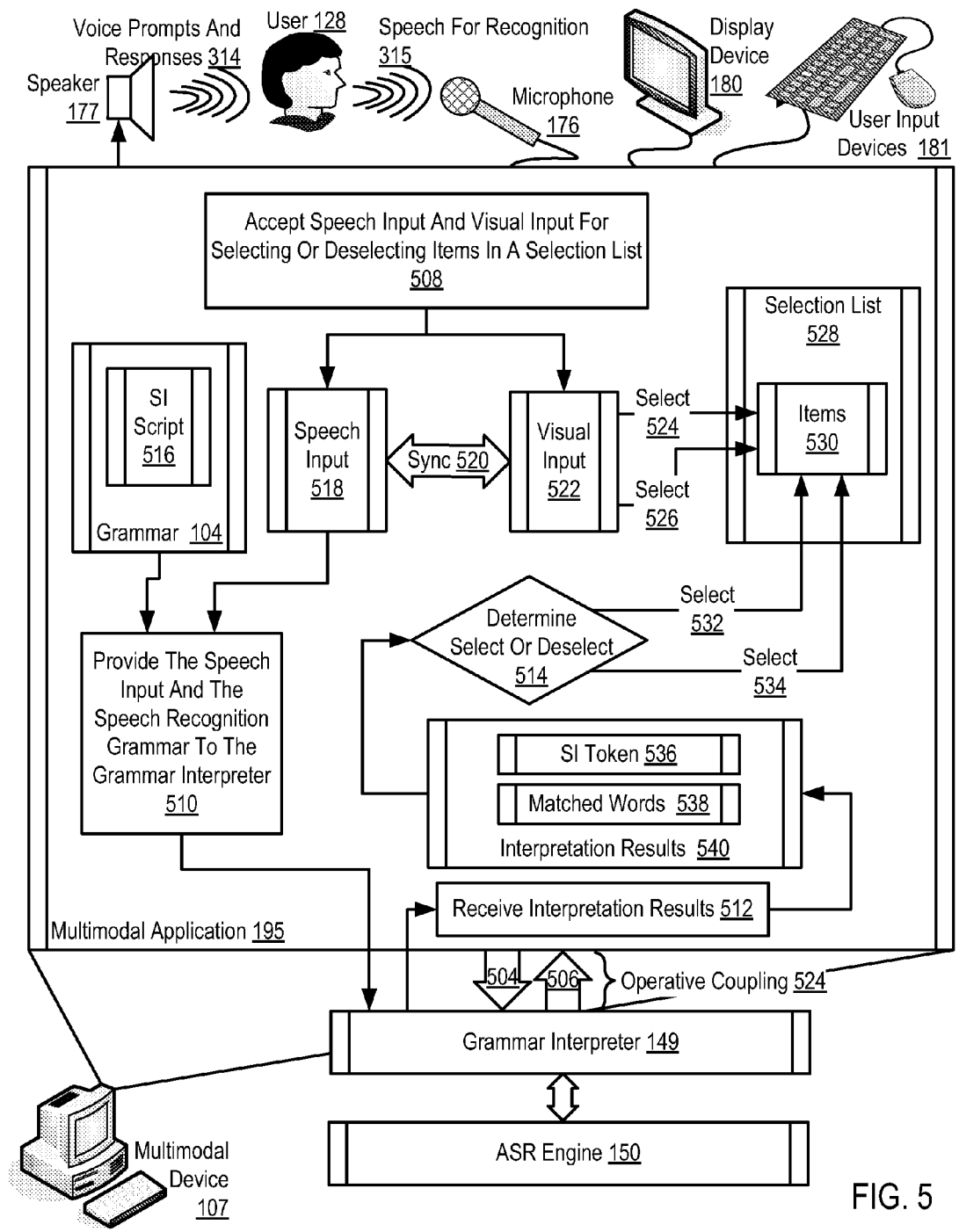
FIG. 5 sets forth a flow chart illustrating an exemplary method of automatic speech recognition according to embodiments of the present invention.

For further explanation, FIG. 5 sets forth a flow chart illustrating an exemplary method of automatic speech recognition according to embodiments of the present invention. Automatic speech recognition in this example is implemented with a speech recognition grammar (104) of a multimodal application (195). The multimodal application (195) operates on a multimodal device (152) supporting multiple modes of user interaction with the multimodal application including a voice mode and one or more non-voice modes of user interaction with the multimodal application. The voice mode is represented in this example with audio output through a speaker (177) and audio input through a microphone (176). Non-voice modes are represented by user input devices (181), a keyboard and a mouse. The non-voice modes include at least one visual mode in which a user may interact with the multimodal application through mouse or keyboard interaction with a graphical user interface ('GUI'), for example, as may be displayed on the display device (180).

The multimodal application (195) is operatively coupled (524) to a grammar interpreter (149). The operative coupling (524) provides a data communications path (504) from the multimodal application (195) to the grammar interpreter for speech recognition grammars (104) and speech input (518). The operative coupling (524) provides a data communications path (506) from grammar interpreter (149) to the multimodal application (195) for return of recognized speech and semantic interpretation results. The grammar interpreter may be, for example, a SALT interpreter or a VoiceXML interpreter. The operative coupling may be effected with a JVM (102 on FIG. 4), an API (316 on FIG. 4) into a VoiceXML interpreter (192 on FIG. 4), or an API (317 on FIG. 4) into a SALT interpreter (103 on FIG. 4), when the multimodal application is implemented in a thick client architecture. When the multimodal application is implemented in a thin client architecture, the operative coupling may include a voice services module (130 on FIG. 3) and a VOIP connection (216 on FIG. 3). When the multimodal application (195) is implemented in X+V, the operative coupling may include a VoiceXML interpreter (192 on FIG. 3). When the multimodal application is implemented in a Java speech framework, the operative coupling may include a Java speech API and a JVM (101, 102 on FIG. 3). When the multimodal application is implemented in SALT, the operative coupling may include a SALT interpreter (103 on FIG. 3).

The method of FIG. 5 includes accepting (508) by the multimodal application (195) speech input (518) and visual input (522) for selecting or deselecting items (530) in a selection list (528). The speech input (518) is enabled by a speech recognition grammar (104), and the speech recognition grammar (104) includes a semantic interpretation script (516) capable of producing a semantic interpretation token (536) having a value that indicates whether to select or deselect items (530) in the selection list (528). The method of FIG. 5 also includes providing (510), from the multimodal application (195) to the grammar interpreter (149), the speech input (518) and the speech recognition grammar (104). The grammar interpreter passes the speech input in digitized form to an ASR engine (150) and receives in return recognized words in text form. The grammar interpreter matches words in the grammar against words in the recognized speech input and also executes the included semantic interpretation script thereby producing a semantic interpretation token. The grammar interpreter returns the interpretation results (540) through the operative coupling (524) to the multimodal application (195), including the matched words (538) from the grammar and the semantic interpretation token (536). The method of FIG. 5 includes receiving (512), by the multimodal application from the grammar interpreter, the interpretation results (540), including the matched words (538) from the grammar that correspond to items (530) in the selection list (528) and the semantic interpretation token (536) that specifies whether to select or deselect items (530) in the selection list (528) that correspond to the matched words (538) from the grammar (104). The method of FIG. 5 also includes determining (514), by the multimodal application (195) in dependence upon the value of the semantic interpretation token (536), whether to select or deselect items (530) in the selection list (528) that correspond to the matched words (538).

In the method of FIG. 5, the semantic interpretation script (516) is also capable of producing a semantic interpretation token (536) specifying that all items (530) in the selection list (528) are to be either selected or deselected. In systems where the semantic interpretation script (516) is also capable of producing a semantic interpretation token (536) specifying that all items (530) in the selection list (528) are to be either selected or deselected, the received interpretation results (540) may include a semantic interpretation token (536) that specifies whether to select or deselect all items (530) in the selection list (528). In such systems, determining (514) whether to select or deselect items in the selection list may include determining in dependence upon the value of the semantic interpretation token (536) whether to select or deselect all items (530) in the selection list (528), regardless of the correspondence of items (530) in the selection list (528) to the matched words (538). In such an example, if the matched words (538) correspond to half of the items (530) in the selection list (528) and the value of the semantic interpretation token (536) specifies that all of the items (530) in the selection list (528) are to be selected, then the multimodal application (195) selects all the items in the selection list regardless of the fact that only half of the items in the selection list correspond to matched words from the grammar.

In the method of FIG. 5, the speech input (518) is synchronized (520) with the visual input (522). The multimodal application (195) may synchronize the speech input (518) with the visual input (522). In multimodal application implemented with X+V, for example, the multimodal application (195) may synchronize the speech input (518) with the visual input (522) with a <sync> element, so that speech dialog results are returned to both the active VoiceXML input field and the corresponding XHTML <input> element, and keyboard data entered into the <input> element updates both the VoiceXML field and the XHTML <input> element.

The following pseudocode is an example of a selection list in a multimodal application expressed in XHTML and including items for selection as pizza toppings labeled Bacon, Chicken, Ham, Meatball, Sausage, and Pepperoni:

---

<b>Meat Toppings:</b><br/>
<input type="checkbox" name="meats" id="meatBacon" value="bacon"/>
   Bacon
<input type="checkbox" name="meats" id="meatChicken" value="chicken"/>
   Chicken
<input type="checkbox" name="meats" id="meatHam" value="ham"/>
   Ham
<br/>
<input type="checkbox" name="meats" id="meatMeatball" value="meatball"/>
   Meatball
<input type="checkbox" name="meats" id="meatSausage" value="sausage"/>
   Sausage
<input type="checkbox" name="meats" id="meatPepperoni"

-continued

```
        value="pepperoni"/>
      Pepperoni
<br/><br/>
```

Figure 6:
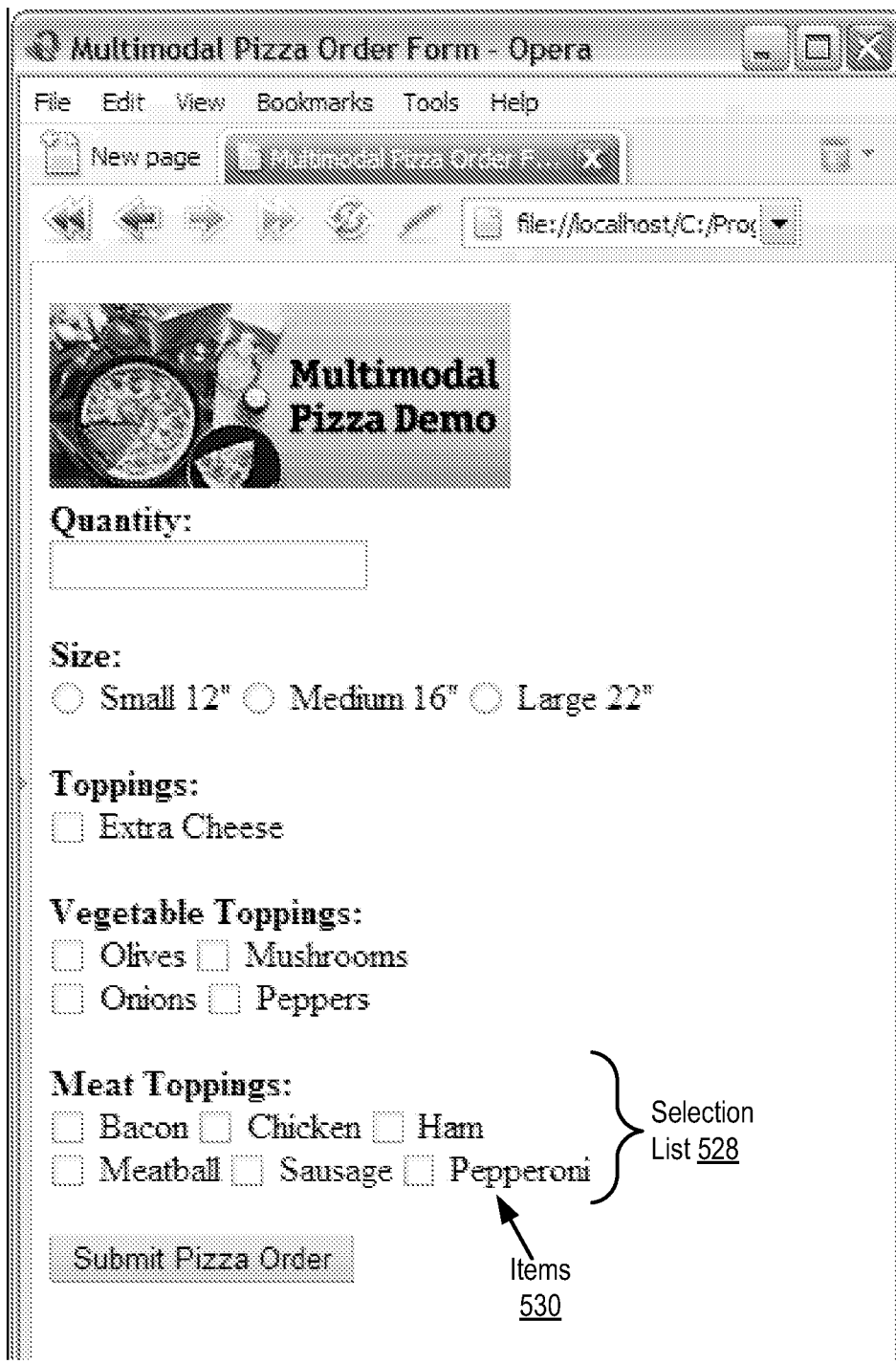
FIG. 6 illustrates a GUI screen for visual input to a multimodal application according to embodiments of the present invention.

This XHTML pseudocode when executed as part of a multimodal application can display a GUI screen for visual input like the one illustrated in FIG. 6, for example. The example GUI screen of FIG. 6 displays a selection list (528) that includes items (530) labeled Bacon, Chicken, Ham, Meatball, Sausage, and Pepperoni. Each item (530) in the selection list (528) has a checkbox that a user can select or deselect with as a mouseclick or other visual input. When the example GUI screen of FIG. 6 is displayed by a multimodal application according to embodiments of the present invention, the selection list is voice-enabled, so that the user can also select or deselect items (530) in the selection list (528) with speech input.

For further explanation, an example grammar is set forth below in SRGS XML format. The example grammar set forth below is used to voice-enable a multimodal application to allow a user to order pizza using speech input, visual input, or a combination of speech and visual input. The example grammar set forth below is referred to generally in this specification as 'the pizza grammar.'

```
<grammar id=" pizza_order">
  <rule id="meat_toppings">
    <tag><![CDATA[$ = new Array;]]></tag>
    <one-of>
      <item>
        <item repeat="0-1">
          <one-of>
            <item>
              <one-of>
                <item> and
                  <item repeat="0-1"> add </item>
                </item>
                <item> add </item>
                <item> also
                  <item repeat="0-1"> add </item>
                </item>
                <item> plus </item>
              </one-of>
              <tag><![CDATA[$.push("_ADD")]]></tag>
            </item>
            <item>
              <one-of>
                <item> remove </item>
                <item> delete </item>
              </one-of>
              <tag><![CDATA[$.push("_REMOVE")]]></tag>
            </item>
          </one-of>
        </item>
        <item repeat="1-"><ruleref uri="#meats"/>
          <item repeat="0-1"> and </item>
          <tag><![CDATA[$.push($meats)]]></tag>
        </item>
      </item>
      <item> select
        <item repeat="0-1"> all </item>
        <tag><![CDATA[$.push("_ADD_ALL")]]></tag>
      </item>
      <item> remove all
        <item repeat="0-1"> selections </item>
        <tag><![CDATA[$.push("_REMOVE_ALL")]]></tag>
      </item>
    </one-of>
  </rule>
  <rule id="meats">
    <one-of>
      <item> bacon </item>
      <item> chicken </item>
      <item> ham </item>
      <item> meatball </item>
      <item> sausage </item>
      <item> pepperoni </item>
    </one-of>
  </rule>
</grammar>
```

The pizza grammar is a speech recognition grammar that includes semantic interpretation scripts capable of producing semantic interpretation tokens having values that indicate whether to select or deselect items in the selection list. The semantic interpretation tag <tag><![CDATA[$.push("_ADD")]]></tag>, for example, contains a semantic interpretation script, $.push("_ADD"), that pushes onto an array of interpretation results an instruction to select items in a selection list. The semantic interpretation tag <tag><![CDATA[$.push("_REMOVE")]]></tag> contains a semantic interpretation script, $.push("_REMOVE"), that pushes onto an array of interpretation results an instruction to deselect items in a selection list. The semantic interpretation tag <tag><![CDATA[$.push("_ADD_ALL")]]></tag> contains a semantic interpretation script, $.push("_ADD_ALL"), that pushes onto an array of interpretation results an instruction to select all of the items in a selection list. The semantic interpretation tag <tag><![CDATA[$.push("_REMOVE_ALL")]]></tag> contains a semantic interpretation script, $.push("_REMOVE_ALL"), that pushes onto an array of interpretation results an instruction to deselect all of the items in a selection list.

If the user says "and add", using the pizza grammar for speech recognition, the grammar interpreter, with Semantic Interpretation, puts the key word "_ADD" as the first item in an array that is used to return interpretation results. When the user goes on to say "bacon chicken ham and meatball," the items "bacon", "chicken", "ham" and "meatball" are put into the array. When the user is finished talking the interpretation results may be represented by the following array:

0: ADD
1: bacon
2: chicken
3: ham
4. meatball

This array represents interpretation results from a grammar interpreter that include matched words from the grammar that correspond to items in the selection list and a semantic interpretation token that specifies whether to select or deselect items in the selection list. The matched words are "bacon," "chicken," "ham," and "meatball," and the semantic interpretation token has the value of "_ADD," specifying that items in the selection list that correspond to the matched words are to be selected. When the multimodal application receives this interpretation result from the grammar interpreter, the multimodal application updates both its speech input controls and its visual input controls to select Bacon, Chicken, Ham, and Meatball. In an X+V application with active <sync> elements, for example, the multimodal browser sets VoiceXML input fields and corresponding XHTML input elements as selected. The settings on previously selected or deselected items are ignored. That is, previously selected items are not first reset to deselected before the input controls are updated with new selections in this example.

Also according to the pizza grammar, the user can say "remove" or "delete" to remove a set of items from the current set of selections. For example, if Bacon, Ham, Meatball, and Pepperoni are currently selected, the user can say "remove ham and pepperoni." As a result, the grammar interpreter returns the following interpretation results:
0: REMOVE
1: ham
2: pepperoni When the multimodal browser synchronizes the VoiceXML "voice_meats" field with the "meats" multiple checkbox control, it first looks at the first item in the array. Because the first item contains "_REMOVE", the browser will de-select the Ham and Pepperoni check boxes. As a result, the selected, or checked, boxes will be the "Bacon and Meatball" toppings.

Also according to the pizza grammar, the user can say "select all" or "remove all." If the user says "select all" the semantic interpretation array will contain only one item, "_ADD_ALL". After the multimodal browser inspects this item it will select all the meat toppings. As a result all the meat topping check boxes will be checked, Bacon, Chicken, Ham, Meatball, Sausage, and Pepperoni. Similarly, if the user says "remove all" the interpretation array will contain one item, "_REMOVE_ALL." As a result, all of the meat toppings are deselected, and none of the meat topping checkboxes will be checked.

Set forth here for further explanation is the ABNF form of the pizza grammar—another, more concise representation of the pizza grammar that was set forth above in the SRGS XML grammar format:

```
$meat_toppings = $NULL {$ = new Array;}
[
    ((and [add] | add | also [add] | plus) {$.push("_ADD")})
    |
    ((remove | delete) {$.push("_REMOVE")})
]
( $meats [and] {$.push($meats)} ) <1->
| select [all] {$.push("_ADD_ALL")}
| remove all [selections] {$.push("_REMOVE_ALL")}
;
$meats = ( (bacon) | (chicken) | (ham) | (meatball) | (sausage) |
(pepperoni) )
;
```

Figure 7:
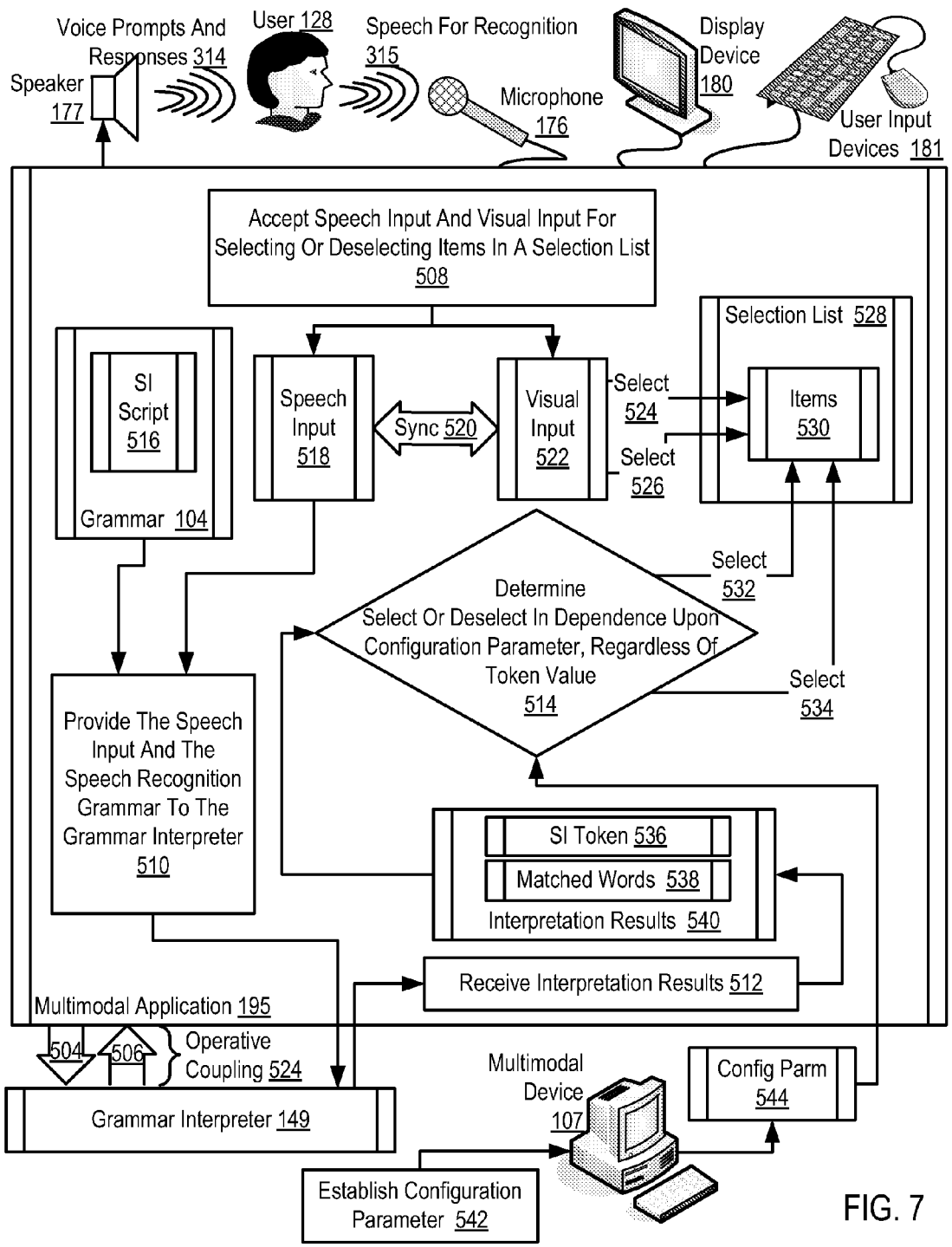
FIG. 7 sets forth a flow chart illustrating a further exemplary method of automatic speech recognition according to embodiments of the present invention.

For further explanation, FIG. 7 sets forth a flow chart illustrating a further exemplary method of automatic speech recognition according to embodiments of the present invention. Automatic speech recognition in this example is implemented with a speech recognition grammar (104) of a multimodal application (195). The multimodal application (195) operates on a multimodal device (152) supporting multiple modes of user interaction with the multimodal application including a voice mode and one or more non-voice modes of user interaction with the multimodal application. The voice mode is represented in this example with audio output through a speaker (177) and audio input through a microphone (176). Non-voice modes are represented by user input devices (181), a keyboard and a mouse. The non-voice modes include at least one visual mode in which a user may interact with the multimodal application through mouse or keyboard interaction with a graphical user interface ('GUI'), for example, as may be displayed on the display device (180).

The multimodal application (195) is operatively coupled (524) to a grammar interpreter (149). The operative coupling (524) provides a data communications path (504) from the multimodal application (195) to the grammar interpreter for speech recognition grammars (104) and speech input (518). The operative coupling (524) provides a data communications path (506) from grammar interpreter (149) to the multimodal application (195) for return of recognized speech and semantic interpretation results. The grammar interpreter may be, for example, a SALT interpreter or a VoiceXML interpreter. The operative coupling may be effected with a JVM (102 on FIG. 4), an API (316 on FIG. 4) into a VoiceXML interpreter (192 on FIG. 4), or an API (317 on FIG. 4) into a SALT interpreter (103 on FIG. 4), when the multimodal application is implemented in a thick client architecture. When the multimodal application is implemented in a thin client architecture, the operative coupling may include an a voice services module (130 on FIG. 3) and a VOIP connection (216 on FIG. 3). When the multimodal application (195) is implemented in X+V, the operative coupling may include a VoiceXML interpreter (192 on FIG. 3). When the multimodal application is implemented in a Java speech framework, the operative coupling may include a Java speech API and a JVM (101, 102 on FIG. 3). When the multimodal application is implemented in SALT, the operative coupling may include a SALT interpreter (103 on FIG. 3).

The method of FIG. 7 is similar to the method of FIG. 5, including as it does accepting (508) by the multimodal application (195) speech input (518) and visual input (522) for selecting or deselecting items (530) in a selection list (528) and providing (510), from the multimodal application (195) to the grammar interpreter (149), the speech input (518) and the speech recognition grammar (104)—both of which functions operate in a similar manner as described above with reference to FIG. 5. The method of FIG. 7, however, also includes establishing (542) in the multimodal device (107) a configuration parameter (544) for the multimodal application (195). The value of the configuration parameter is user-editable, through a GUI input screen, for example. The value of the configuration parameter indicates whether to add to existing item selections items that correspond to the matched words or replace existing item selections with items that correspond to the matched words. And in the method of FIG. 7, determining (514) whether to select or deselect items (530) in the selection list (528) that correspond to the matched words (538) is carried out by determining whether to select or deselect items in the selection list that correspond to the matched words in dependence upon the value of the configuration parameter (544), regardless of the value of the semantic interpretation token (536).

For further explanation, consider the example from the pizza grammar above where the user speaks "remove" or "delete" along with "ham" and "pepperoni," and the grammar interpreter returns the interpretation results:
0: REMOVE
1: ham
2: pepperoni In this example, the value of the configuration parameter (544) is set to "_ADD," and the value of the semantic interpretation token is "_REMOVE." The multimodal application would ordinarily treat this value of the semantic interpretation token as an instruction to deselect Ham and Pepperoni items in the selection list of pizza toppings. In this example, however, the value of the configuration parameter overrides the semantic interpretation token, and the multimodal application selects the Ham and Pepperoni items in the selection list of pizza toppings—despite the fact that the semantic interpretation token specifies deselecting and despite the fact that the Ham and Pepperoni items may already be selected.

Exemplary embodiments of the present invention are described largely in the context of a fully functional computer system for automatic speech recognition with a selection list.

Readers of skill in the art will recognize, however, that the present invention also may be embodied in a computer program product disposed on computer-readable signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of automatic speech recognition ('ASR'), the method implemented with a speech recognition grammar of a multimodal application, with the multimodal application operating on a multimodal device supporting multiple modes of user interaction with the multimodal application, the modes of user interaction including a voice mode and a visual mode, the multimodal application operatively coupled to a grammar interpreter and configured to enable a user of the multimodal application to select or deselect multiple items in a selection list using a single utterance, the method comprising:

accepting, by the multimodal application, speech input corresponding to the single utterance for selecting or deselecting one or more items in the selection list;
   providing, from the multimodal application to the grammar interpreter, the speech input and a speech recognition grammar associated with the selection list;
   receiving, by the multimodal application from the grammar interpreter, interpretation results, the interpretation results including at least one matched word from the grammar that identifies at least one item in the selection list and a separate indication of whether to select or deselect the at least one item in the selection list, wherein the separate indication is based, at least in part, on the speech input; and
   selecting or deselecting based, at least in part, on the separate indication, the at least one item in the selection list that corresponds to the at least one matched word.

2. The method of claim 1 wherein the speech input is synchronized by the multimodal application with a visual input.

3. The method of claim 1 wherein:
   the separate indication of whether to select or deselect the at least one item in the selection list indicates that all items in the selection list are to be either selected or deselected; and
   selecting or deselecting all items in the selection list based, at least in part, on the separate indication, regardless of a correspondence of items in the selection list to the at least one matched-word.

4. The method of claim 1 further comprising:
   establishing in the multimodal device a configuration parameter for the multimodal application, the value of the configuration parameter being user-editable and indicating whether to add to existing item selections items that correspond to the at least one matched word, or to replace existing item selections with items that correspond to the at least one matched word;
   wherein determining whether to select or deselect items in the selection list that correspond to the at least one matched word further comprises determining whether to select or deselect items in the selection list that correspond to the at least one matched word based, at least in part, on the value of the configuration parameter, regardless of the content of the separate indication of whether to select or deselect the at least one item in the selection list.

5. The method of claim 1 wherein the multimodal device further comprises a thick multimodal client device including the multimodal application, the grammar interpreter, and functionality for performing speech recognition and grammar interpretation, including semantic interpretation.

6. The method of claim 1 wherein the multimodal device further comprises a thin multimodal client device, the thin multimodal client device obtaining grammar interpretation, semantic interpretation, and speech recognition services from a voice server located remotely across a network from the thin multimodal client device.

7. Apparatus for automatic speech recognition ('ASR') for use with a speech recognition grammar of a multimodal application, with the multimodal application operating on a multimodal device supporting multiple modes of user interaction with the multimodal application, the modes of user interaction including a voice mode and a visual mode, the multimodal application operatively coupled to a grammar interpreter and configured to enable a user of the multimodal application to select or deselect multiple items in a selection list using a single utterance, the apparatus comprising:

a computer processor; and
   a computer memory operatively coupled to the computer processor, the computer memory storing a computer program that, when executed by the computer processor, performs a method comprising:
      accepting by the multimodal application speech input corresponding to the single utterance for selecting or deselecting one or more items in the selection list;
      providing, from the multimodal application to the grammar interpreter, the speech input and a speech recognition grammar associated with the selection list;
      receiving, by the multimodal application from the grammar interpreter, interpretation results, the interpretation results including at least one matched word from the grammar that identifies at least one item in the selection list and a separate indication of whether to select or deselect the at least one item in the selection list, wherein the separate indication is based, at least in part, on the speech input; and selecting or deselecting, based, at least in part, on the separate indication, the at least one item in the selection list that corresponds to the at least one matched word.

8. The apparatus of claim 7 wherein the speech input is synchronized by the multimodal application with a visual input.

9. The apparatus of claim 7 wherein:
the separate indication of whether to select or deselect the at least one item in the selection list indicates that all items in the selection list are to be either selected or deselected; and
selecting or deselecting all items in the selection list based, at least in part, on the separate indication, regardless of a correspondence of items in the selection list to the at least one matched-word.

10. The apparatus of claim 7, wherein the method further comprises:
establishing in the multimodal device a configuration parameter for the multimodal application, the value of the configuration parameter being user-editable and indicating whether to add to existing item selections, items that correspond to the at least one matched word or replace existing item selections with items that correspond to the at least one matched word;
wherein determining whether to select or deselect items in the selection list that correspond to the at least one matched word further comprises determining whether to select or deselect items in the selection list that correspond to the at least one matched word based, at least in part, on the value of the configuration parameter, regardless of the content of the separate indication of whether to select or deselect the at least one item in the selection list.

11. The apparatus of claim 7 wherein the multimodal device further comprises a thick multimodal client device including the multimodal application, the grammar interpreter, and functionality for performing speech recognition and grammar interpretation, including semantic interpretation.

12. The apparatus of claim 7 wherein the multimodal device further comprises a thin multimodal client device, the thin multimodal client device obtaining grammar interpretation, semantic interpretation, and speech recognition services from a voice server located remotely across a network from the thin multimodal client device.

13. A computer-readable recordable medium encoded with a plurality of instructions that, when executed by a computer, perform a method comprising:
accepting, by a multimodal application, speech input for incrementally selecting or deselecting at least one item in a selection list, wherein the speech input includes an indication of whether to select or deselect the at least one item;
providing, from the multimodal application to a grammar interpreter, the speech input and a speech recognition grammar associated with the selection list;
receiving, by the multimodal application from the grammar interpreter, interpretation results, the interpretation results including at least one matched word from the grammar that identifies at least one item in the selection list and a separate indication of whether to select or deselect the at least one item in the selection list, wherein the separate indication is based, at least in part, on the indication in the speech input of whether to select or deselect the at least one item; and
selecting or deselecting based, at least in part, on the separate indication, the at least one item in the selection list that corresponds to the at least one matched word without first deselecting all previously selected items in the selection list.

14. The computer-readable recordable medium of claim 13 wherein the speech input is synchronized by the multimodal application with a visual input.

15. The computer-readable recordable medium of claim 13 wherein:
the separate indication of whether to select or deselect the at least one item in the selection list indicates that all items in the selection list are to be either selected or deselected; and
selecting or deselecting all items in the selection list based, at least in part, on the separate indication, regardless of a correspondence of items in the selection list to the at least one matched-word.

16. The computer-readable recordable medium of claim 13, wherein the method further comprises:
establishing in the multimodal device a configuration parameter for the multimodal application, the value of the configuration parameter being user-editable and indicating whether to add to existing item selections, items that correspond to the at least one matched word or replace existing item selections with items that correspond to the at least one matched word;
wherein determining whether to select or deselect items in the selection list that correspond to the at least one matched word further comprises determining whether to select or deselect items in the selection list that correspond to the at least one matched word based, at least in part, on the value of the configuration parameter, regardless of the content of the separate indication of whether to select or deselect the at least one item in the selection list.

17. The computer-readable recordable medium of claim 13 wherein the multimodal device further comprises a thick multimodal client device including the multimodal application, the grammar interpreter, and functionality for performing speech recognition and grammar interpretation, including semantic interpretation.

18. The computer-readable recordable medium of claim 13 wherein the multimodal device further comprises a thin multimodal client device, the thin multimodal client device obtaining grammar interpretation, semantic interpretation, and speech recognition services from a voice server located remotely across a network from the thin multimodal client device.

* * * * *